(12) United States Patent
Tanaka et al.

(10) Patent No.: US 6,907,359 B2
(45) Date of Patent: Jun. 14, 2005

(54) CALORIMETER

(75) Inventors: Keiichi Tanaka, Chiba (JP);
Toshimitsu Morooka, Chiba (JP);
Satoshi Nakayama, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 7 days.

(21) Appl. No.: 10/417,906

(22) Filed: Apr. 17, 2003

(65) Prior Publication Data

US 2004/0030505 A1 Feb. 12, 2004

(30) Foreign Application Priority Data

Apr. 18, 2002 (JP) ........................................ 2002-116576

(51) Int. Cl.[7] .................................................. G01K 7/00
(52) U.S. Cl. ...................... 702/40; 702/132; 250/336.2; 374/45; 374/176
(58) Field of Search ............................. 702/40, 31, 49, 702/132, 134, 136; 250/336.2, 310, 363.03, 370.09; 374/176, 45

(56) References Cited

U.S. PATENT DOCUMENTS

| | | | | |
|---|---|---|---|---|
| 5,641,961 A | * | 6/1997 | Irwin et al. | 250/336.2 |
| 5,821,541 A | * | 10/1998 | Tumer | 250/370.09 |
| 5,880,468 A | * | 3/1999 | Irwin et al. | 250/336.2 |
| 6,239,431 B1 | * | 5/2001 | Hilton et al. | 250/336.2 |
| 6,455,849 B1 | * | 9/2002 | Hilton et al. | 250/336.2 |

* cited by examiner

Primary Examiner—Bryan Bui
Assistant Examiner—Hien Vo
(74) Attorney, Agent, or Firm—Adams & Wilks

(57) ABSTRACT

A superconducting radiation detector relies upon the abruptness of a superconducting transition edge to converts a slight heat generated by an X-ray into a high signal current and uses an electrothermal self-feedback mechanism to provide a high energy resolution and a high counting rate. A calorimeter incorporating such a radiation detector has an absorber for absorbing X-rays, a resistor formed of a superconductor provided under the absorber and having a resistance value that varies with heat generated in the absorber, superconducting wires for connecting the resistor to an external current detector, a membrane on which the resistor is provided, and an insulating film provided between the resistor and the absorber and having at least one hole penetrating therethrough, the resistor and the absorber being in contact through the hole.

20 Claims, 2 Drawing Sheets

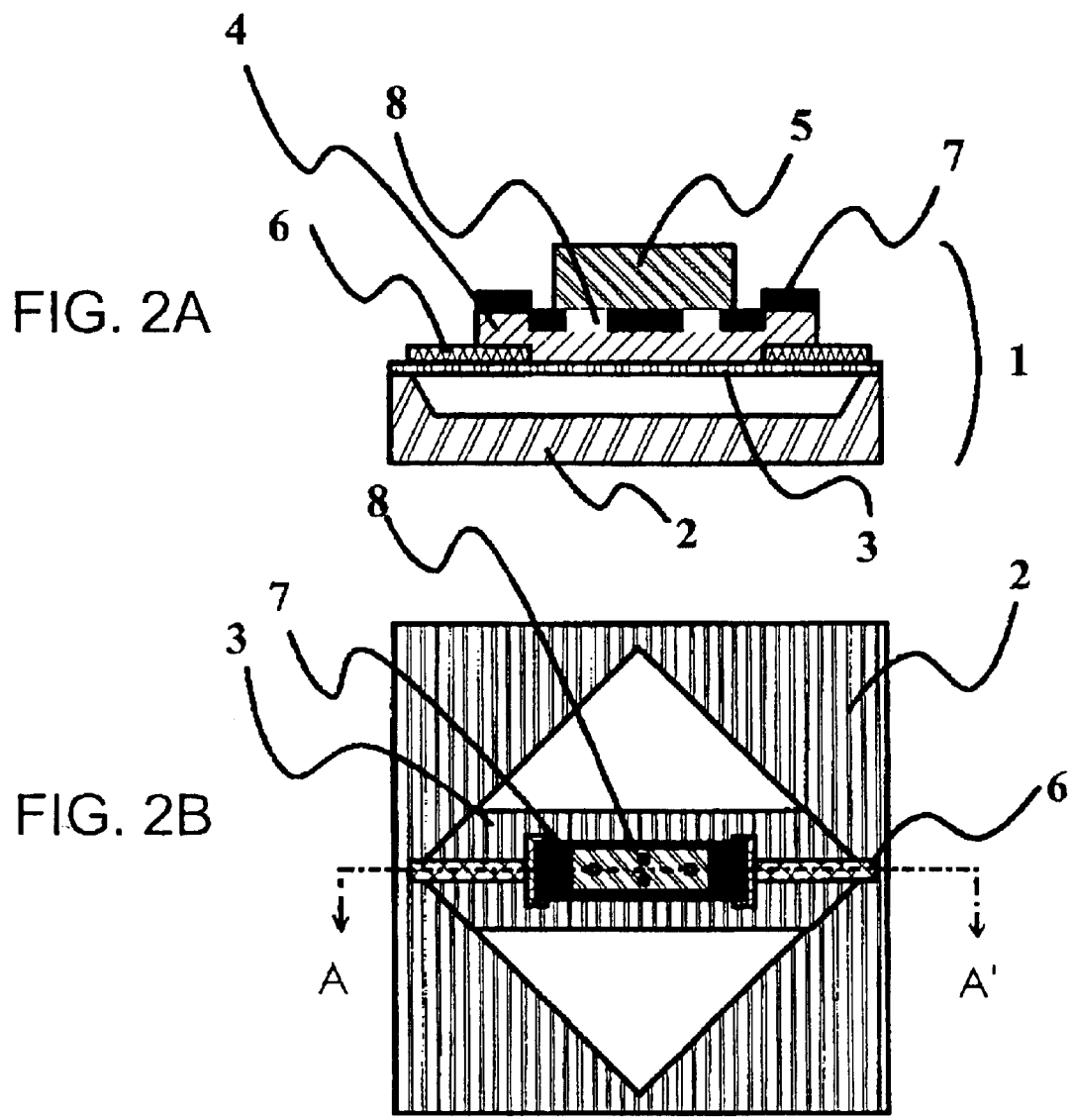

CALORIMETER

BACKGROUND OF THE INVENTION

1. Field of the Invention

The present invention relates to a superconducting radiation detector having a high energy resolution and a high counting rate by using the abruptness of a superconducting transition edge for converting a slight heat generated by an X-ray into a high signal current, and using an electrothermal self-feedback mechanism.

2. Description of the Related Art

Microcalorimeters using a superconducting transition edge have a higher energy resolution and a higher counting rate (hereinafter referred to as "microcalorimeter") than detectors using semiconductors, such analyzers have been attracting attention for analysis of elements or impurity tests. Energy Dispersive Spectroscopy (EDS) is known, and use detectors according to the related are having semiconductors to quickly carry out analysis of elements for a wide range of energy. However, since energy resolution depends on the energy gap of a semiconductor, it cannot be below 100 eV. Thus, a microcalorimeter for use as a detector having both an improved energy resolution and a high counting rate is desirable. In a microcalorimeter, the temperature is set to the vicinity of the superconducting transition, a constant voltage is driven, and thus an electrothermal self-feedback mechanism functions to achieve a high energy resolution and a high counting rate. Details of microcalorimeters are described in K. D. Irwin, Applied Physics Letters 66, 1988 (1995). A superconducting transition temperature represents the temperature of transition from a normal conducting state to a superconducting state of a material. The vicinity effect by forming a thin film of a normal conductor on a superconductor shifts the superconducting transition temperature to a lower temperature as compared to that of a single layer. The film thickness ratio between the superconductor and the normal conductor determines the amount of shift in the transition temperature. In the case where the microcalorimeter has a bilayer structure comprised of a superconductor and a normal conductor, hot electrons generated by absorption of radiation mostly diffuse in the normal conductor. Diffusion of electrons should be as quick as possible, because a shorter diffusion length increases the time of temperature rise of the calorimeter Accordingly, the variation in peak values of waveforms of signal pulses is effected. Particularly, the phenomenon that the thinner the film is, the shorter the diffusion length of the electron is called the effect of thin film.

In a calorimeter, an absorber is provided on a resistor, and thus the area of the resistor is required to be larger than that of the absorber. To improve the efficiency of absorbing X-rays, it is required that the absorber is thick or the area thereof is large. Therefore, the area of the resistor cannot be smaller than that of the absorber.

In case that the absorber is a normal conductor, a part of the resistor under the absorber turns into the normal conducting state due to the vicinity effect, and the superconducting transition temperature is determined by a part of the resistor on the side opposite to the absorber. In case that the size of the resistor is fixed, the transition temperature of a calorimeter having an absorber is lower than that of a calorimeter having no absorber, which also causes a problem of a large width of transition. A large transition width degrades the energy resolution and the counting rate of the calorimeter.

SUMMARY OF THE INVENTION

The invention provides a calorimeter with neither reduction in area of the absorber nor degradation of width of a superconducting transition temperature.

In accordance with the present invention, in a calorimeter comprised of an absorber that absorbs x-rays and generates heat, a resistor on which the absorber is superimposed, and which has a resistance value that varies with by the heat generated by the absorber, superconducting wires that connect the resistor and an external current detector, and a membrane on which the resistor is superimposed, wherein the resistor comprises a superconductor, and a Joule heat generated by a current that is steadily flown in the resistor and a Joule heat generated in the absorber are thermally balanced and transfer in the membrane, an insulating film having a hole penetrating in the thickness direction (direction from the resistor to the absorber) is provided between the resistor and the absorber.

BRIEF DESCRIPTION OF THE DRAWINGS

FIG. 2A is a cross-sectional view of a calorimeter according to a second embodiment of the invention; and FIG. 2B is a plan view of the calorimeter according to the second embodiment of the invention.

DETAIL DESCRIPTION OF THE INVENTION

Figures 1A, 1B:
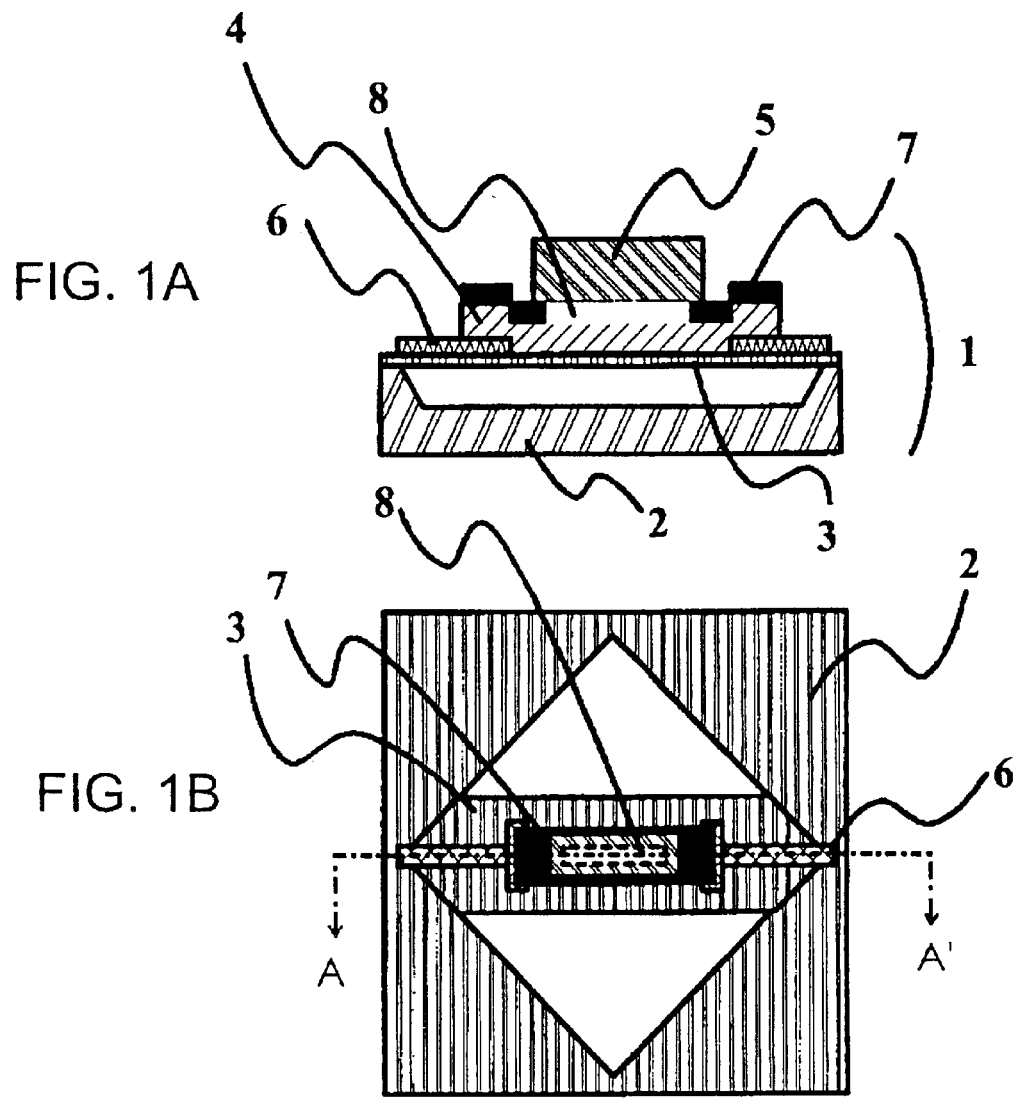
FIG. 1A is cross-sectional view of a calorimeter according to a first embodiment of the invention.
FIG. 1B is plan view of the calorimeter according to the first embodiment of the invention.

To realize a calorimeter without a reduction in the area of the absorber nor degradation in the width of a superconducting transition temperature, the calorimeter according to the present invention is comprised of an absorber that absorbs X-rays and generates heat, a resistor on which the absorber is superimposed that has a resistance value that varies with the heat generated by the absorber, superconducting wires that connect the resistor and an external current detector, and a membrane on which the resistor is superimposed, wherein the resistor is constituted by a superconductor, and a Joule heat generated by a current that is steadily flown in the resistor and a Joule heat generated in the absorber are thermally balanced and transfer in the membrane, and an insulating film is provided between the resistor and the absorber. Particularly, in case of providing a single penetrating hole through the insulating film in the direction of the thickness of the film, the hole is arranged parallel to the direction of a bias current and the shape of the cross section, of the direction of the diameter of the penetrating hole, is a rectangle of which the sides parallel to the direction of the current are the long sides. In case of providing a plurality of penetrating holes through the insulating film in the thickness direction thereof, the holes are arranged such that at least two of the penetrating holes are parallel to the direction of the current. In case that the absorber is normal conductor and is thick enough, positions distant enough from the resistor (longer than the length of coherent) are not affected by the resistor, and thus hot electrons can move freely. Hot electrons generated by the absorber diffuse inside the absorber, and transfer to the resistor through the provided holes. Thus, the speed at which the hot electrons spread in the entire calorimeter is determined by the diffusion coefficient of the absorber and the average free stroke. In case of gold of a size of 300 $\mu$m×300 $\mu$m, for example, the hot electrons can diffuse in 1 $\mu$s. A time of 1 μs is short enough compared to the time constant of a calorimeter (100 μs, for example). Accordingly, the peak value s of waveforms of pulses are determined uniquely no matter where in the absorber X-rays are absorbed, and thus there is no position dependency of the pulses, which prevents degradation of energy resolution.

Further, since the current flows in the absorber through the two penetrating holes arranged parallel to the direction of the current, the resistance value of the calorinmeter is determined virtually by the resistance value of the absorber. In case that the resistance value is smaller and the flowing current is constant, the Joule heat by the current decreases, thereby reducing the thermal conductance of the membrane. Thus, the SN ratio (Signal to Noise) becomes greater, which allows improvement of energy resolution.

The insulating film is provided between the absorber and the resistor so that the superconductivity of the part of the resistor under the insulating film is not weakened by the vicinity effect. Thus, even when the area of the absorber and that of the resistor are close to each other or the same, the superconductivity of the resistor is maintained with the exception of a part where the resistor and the absorber contact each other. Consequently, by making the area where the resistor and the absorber contact each other smaller, the drop in the superconducting transition temperature is prevented, and the transition width is narrowed, thereby achieving an improvement of the energy resolution and the counting rate.

In case of four penetrating holes, two penetrating holes are arranged parallel to the direction of the current, and the other two penetrating holes are arranged vertical in the calorimeter.

The hot electrons generated from the absorber by absorption of X-rays isotropically diffuse inside the absorber. To raise the temperature of the resistor uniformly, it is required that the hot electrons having diffused inside the absorber reach the resistor as quickly as possible and uniformly diffuse in the resistor. Two holes are arranged parallel to the current, the other two holes are arranged vertically, and thus the hot electrons can quickly reach inside the resistor, no matter where inside the absorber the hot electrons are generated. Since it is electrons that transfer heat in the resistor, the electron generated in the absorber diffuse inside the resistor to raise the temperature of the calorimeter uniformly and quickly.

Thus, the peak values of pulse waveforms are determined uniquely no matter where in the absorber X-rays are absorbed, and thus there is no position dependency of pulses, which prevents degradation of energy resolution.

A material that cannot be etched by hydrogen fluoride is used for the insulating film of the calorimeter. If a material which can be etched by hydrogen fluoride is used as a constituent material for the calorimeter other than the insulating film, titanium is prevented from being etched by the hydrogen fluoride in a process stage because the insulating film functions as a protection film. Particularly, tantalum pentoxide is hydrogen-fluoride resistant and can be easily formed into a film by sputtering.

Thus, as a material for the resistor construing the calorimeter, a material that can be etched by hydrogen fluoride can be adopted, thereby making it easy to make the calorimeter without limit in material for the resistor.

First Embodiment

FIGS. 1A and 1B are schematic diagrams of a calorimeter, according to a first embodiment of the invention, provided with an insulating film 7 between a resistor 4 and an absorber 5. FIG. 1B is a plan view, and FIG. 1A is a cross-sectional view taken along line A–A' of FIG. 1B. The absorber 5 for absorbing X-rays is superimposed on the resistor 4 which has a resistance value that varies in accordance with heat generated by the absorber. The resistor 4 is connected to an external current detector through superconducting wires 6. The resistor 4 is superimposed on a membrane 3. The resistor 4 is constituted by a superconductor and a Joule heat generated by a current that is steadily flow in the resistor 4 and a Joule heat generated by the absorber 5 are thermally balanced and transfer in the membrane.

In the calorimeter 1, the membrane 3 is provided on a board 2, and the resistor 4, the absorber 5, and the superconducting wires 6 are superimposed on the membrane 3. The insulating film 7 is provided between the resistor 4 and the absorber 5. The membrane 3 is used to control the heat flow rate of a heat that is generated by the resistor 4 and flows to the board 2. The heat generated by the resistor 4 is slight, and the thermal conductance required for the membrane 3 is, for example, not higher than 20 nW/K. For the membrane 3, a thin film of silicon nitride of a thickness not greater than 1 μm is used, for example. To operate the calorimeter 1 at 400 mK for example, the resistor 4 is to have a bilayer structure of Au (30–40 nm) and Ti (60–100 nm). Although the transition temperature of a Ti thin film is approximately 600 mK, the transition temperature can be dropped to 400 mK by the vicinity effect due to the bilayer structure. The absorber 5 is preferably constituted of a material with a low resistance rate, gold or copper for example, so that hot electrons generated by absorption of X-rays diffuse quickly. The insulating film 7 is used to restrict the movement of electrons between the resistor 4 and the absorber 5, and a Cooper pair specific to superconductivity that the resistor 4, which is constituted by a superconductor, has can restrict the intrusion of electrons into the absorber 5. To partially connect the resistor 4 and the absorber 5 electrically, a penetrating hole 8 is provided through the insulating film 7 in the direction of thickness thereof. In case that the absorber 5 is thick enough, a part, of the resistor 4, contacting with the absorber 5 is all the time in a normal conducting state due to the vicinity effect. That is, although the part, of the resistor 4, under the insulating film 7 transits to a superconducting state at 400 mK, the part, of the resistor 4, contacting with the absorber 5 is maintained in the normal conducting state.

As a material for the insulating film 7, tantalum pentoxide can be adopted for example. Titanium, which is used for the resistor 4, can be etched by hydrogen fluoride, and accordingly a material that cannot be etched by hydrogen fluoride is preferable for the insulating film 7. Tantalum pentoxide is a material that cannot be etched.

Operation of the calorimeter 1 will be described below. The calorimeter 1 is driven by a constant voltage, and a Joule heat is generated by current flowing in the resistor 4. The Joule heat is maintained in a thermal equilibrium state with heat going out through the membrane 3. When heat produced by X-rays or the like enters the calorimeter 1 in the thermal equilibrium state, the resistance value rises, and the calorimeter 1 enters a thermal non-equilibrium state. As the calorimeter 1 is in a constant voltage state at all time, a change in the resistance value generates a current pulse, and the energy of the X-rays can be obtained by measuring the peak value of the waveform of the current pulse. The calorimeter 1 having entered the thermal non-equilibrium state reenters the thermal equilibrium state as before by its thermal self-feedback function. In case that there is a hole parallel to the direction of the current flow as shown in FIGS. 1A and 1B, and the resistor 4 is in the normal conducting state, the current does not flow in the resistor 4 but in the absorber 5, because the absorber 5 is formed of a material such as gold or copper that has a lower resistance value compared to that of the resistor 4. By making the resistance value of the calorimeter 1 and the thermal conductance of the membrane 3 low, the current flowing into the resistor 4 can be decreased. In case that the current flowing in the resistor 4 is thus decreased, the Joule heat generated in the calorimeter 1 can be lowered. The calorimeter 1 is lowered so that the burden of the cooling capacity of the refrigerator is decreased. When the Joule heat and X-rays are absorbed by the absorber 5, electrons in the vicinity of the Fermi surface of the absorber 5 are excited, and hot electrons are generated. Since the absorber 5 is a normal conductor, the hot electrons diffuse inside the absorber 5 as free electrons. In case that the size of the absorber 5 is 300 $\mu m \times 300$ $\mu m$, the diffusion takes less than 1 $\mu s$. The hot electrons diffuse into the resistor 4 through the hole. The hot electrons diffuse inside the resistor 4 under the insulating film 7, and thus the temperature of the resistor 4 finally rises uniformly.

Further, the heat capacity of the calorimeter 1 is to be lowered for a greater peak values of the waveforms of pulse signals. The time constant of a pulse signal is given by (heat capacity C)/(thermal conductance G). As described above, since the thermal conductance should be as low as possible, the heat capacity should be low for a small time constant. In case that the heat capacity of the calorimeter 1 is primarily determined by the heat capacity of the resistor 4, the volume or the transition temperature of the resistor 4 should be small or low. In case that the transition temperature is fixed to 400 mK, for example, the volume should be decreased for a low heat capacity. The thickness of the resistor 4 is determined by the thickness of the constituent material, a bilayer structure of Au (30–40 nm) and Ti (60–100 nm) for example, at the superconducting transition temperature. Therefore, the area of the resistor 4 should be small to lower the volume. In a structure according to the related art, the resistor 4 is required to be larger than the absorber 5 to secure a superconducting region. In the present structure, as the superconductivity of the resistor 4 under the absorber 5 is secured by the insulating film 7, the absorber 5 may be as large as the resistor 4. Thus, the area of the resistor 4 can be smaller than that of the structure according to the related art, which achieves improvement of energy resolution.

The abruptness of the gradient of the superconducting transition temperature in transition from the normal conducting state to the superconducting state depends on the contacting area between the resistor 4 and the absorber 5. In case that the contacting area increases, the transition temperature shifts to the lower temperature side, and the abruptness becomes gentle. An abruptness is the degree of abruptness of the amount of change in the resistance value per unit temperature. In case that there is an insulating film 7 between the resistor 4 and the absorber 5 as in the invention, by providing the hole 8 through the insulating film 7 only at a part requiring electric connection, the contacting area between the resistor 4 and the absorber 5 is decreased, and restriction of dropping of the transition temperature and maintenance of the abruptness are achieved.

Second Embodiment

FIG. 2B is a schematic diagram of a calorimeter, according to a second embodiment of the invention, provided with four holes, wherein two of them are arranged along a line parallel to the direction of a current, and the other two are arranged along a line perpendicular thereto. FIG. 2A is a cross-sectional view taken along the line A–A' of FIG. 2B.

Hot electrons generated in an absorber 5 by absorption of X-rays isotropically diffuse inside the absorber. To raise the temperature of a resistor 4 uniformly, it is required that the hot electrons having diffused in the absorber 5 reach the resistor 4 as quickly as possible and uniformly diffuse in the resistor 4. Two holes out of the four holes 8 are arranged parallel to the current, the other two holes are arranged vertically, and thus the hot electrons can quickly reach inside the resistor 4, no matter where inside the absorber the hot electrons are generated. Since it is electrons that primarily transfer heat in the resistor 4, the electron generated inside the absorber 5 diffuse into the resistor 4, thereby raising the temperature of the calorimeter 1 uniformly and quickly.

Thus, the peak values of pulse waveforms are determined uniquely no matter where in the absorber X-rays are absorbed, and thus there is no position dependency of pulses, which prevents the degradation of energy resolution.

Effects of the Invention (1) As described above, by using an insulating film provided with a penetrating hole, hot electrons generated by absorption of X-rays by an absorber diffuse inside the absorber quickly and uniformly be able to raise the temperature of a resistor through the hole and restrict the variation of the peak values of the waveforms of current pulses generated in the resistor. Further, the insulating film is provided between the absorber and the resistor, thereby maintaining the superconductivity of the resistor under the insulating film even the case that the absorber and the resistor are virtually of an equal size. Thus, the invention provides a calorimeter that can restrict the variation of the peak values of current waveforms more and has a high energy resolution than a calorimeter according to the related art.

(2) In case that there are a plurality of penetrating holes described above, at least two holes are arranged parallel to the direction of the current, most of the current flowing in the calorimeter flows in the resistor. Therefore, in case that the absorber is a thick metal body, the resistance value of the absorber is particularly low so that the resistance value of the calorimeter is lowered. By a low resistance value of the calorimeter and a low current flowing, the Joule heat generated in the calorimeter can be lowered. The low Joule heat makes the temperature distribution inside the calorimeter almost uniform. The uniform temperature distribution decreases the fluctuation of temperature inside the calorimeter, and the energy resolution of the calorimeter is improved.

(3) In case that four holes are provided such that two of them are arranged parallel to the current and the other two are arranged vertically, hot electrons generated by absorbing X-rays can warm the resistor uniformly through the holes and restrict the variation of peak values of current pulses generated in the resistor. Thus, a calorimeter having a high energy resolution can be provided.

(4) In the case that the insulating film is made of a material that cannot be etched by hydrogen fluoride, when the material constituting the calorimeter is etched by hydrogen fluoride, an essential part of the calorimeter is protected from etching by hydrogen fluoride, making it possible to make the calorimeter stably in a process. Particularly, tantalum pentoxide can be easily formed into a film by sputtering at a room temperature, which makes the process easier.

What is claimed is:

1. A calorimeter comprising: an absorber for absorbing X-rays; a resistor formed of a superconductor provided under the absorber and having a resistance value that varies with heat generated in the absorber so that Joule heat generated in response to a steady current flow in the resistor is thermally balanced with heat generated in the absorber; superconducting wires for connecting the resistor to an external current detector; a membrane on which the resistor is provided and into which heat generated in the absorber and the resistor is transferred; and an insulating film provided between the resistor and the absorber and having at least one hole penetrating therethrough, the resistor and the absorber being in contact through the hole.

2. A calorimeter according to claim 1; wherein the at least one hole comprises a plurality of holes, at least two of which are arranged along a line parallel to a direction of current flow through the resistor.

3. A calorimeter according to claim 1; wherein the at least one hole comprises four holes, two of which are arranged along a line parallel to a direction of current flow through the resistor, and the other two of which are arranged along a line perpendicular to the direction of current flow through the resistor.

4. A calorimeter according to claim 1; wherein the insulating film is formed of a material that cannot be etched by hydrogen fluoride.

5. A calorimeter according to claim 4; wherein the insulating film is formed of tantalum pentoxide.

6. A calorimeter according to claim 4; wherein the resistor is formed of a material that can be etched by hydrogen fluoride.

7. A calorimeter according to claim 1; wherein the hole is rectangular and has a longer side parallel to a direction of current flow through the resistor.

8. A calorimeter according to claim 1; wherein the resistor has a bilayer structure comprised of a layer of Au and a layer of Ti.

9. A calorimeter according to claim 8; wherein a thickness of the Au layer is in the range of 30 nm–40 nm and a thickness of the Ti layer is in the range of 60 nm–100 nm.

10. A calorimeter comprising: a resistor having a resistance value that varies with heat; an absorber provided on the resistor for absorbing incident radiation; an insulating film interposed between the resistor and the absorber and having at least one hole penetrating from the resistor to the absorber; and a membrane on which the resistor is provided and into which heat generated in the absorber and the resistor is transferred.

11. A calorimeter according to claim 10; wherein the resistor and the absorber are in contact with each other through the at least one hole.

12. A calorimeter according to claim 10; wherein the resistor is formed of a superconductive material.

13. A calorimeter according to claim 10; further comprising superconducting wires for connecting the resistor to an external current detector.

14. A calorimeter according to claim 10; wherein heat generated in response to a steady current flow in the resistor is thermally balanced with heat generated in the absorber.

15. A calorimeter according to claim 10; wherein the at least one hole comprises a plurality of holes, at least two of which are arranged along a line parallel to a direction of current flow through the resistor.

16. A calorimeter according to claim 10; wherein the at least one hole comprises four holes, two of which are arranged along a line parallel to a direction of current flow through the resistor, and the other two of which are arranged along a line perpendicular to the direction of current flow through the resistor.

17. A calorimeter according to claim 10; wherein the insulating film is formed of a material that cannot be etched by hydrogen fluoride.

18. A calorimeter according to claim 17; wherein the insulating film is formed of tantalum pentoxide.

19. A calorimeter according to claim 17; wherein the resistor is formed of a material that can be etched by hydrogen fluoride.

20. A calorimeter according to claim 10; wherein the hole is rectangular and has a longer side in a direction of current flow through the resistor.

* * * * *